United States Patent
Greevy

(10) Patent No.: US 10,904,266 B1
(45) Date of Patent: Jan. 26, 2021

(54) SYSTEM AND METHOD FOR VERIFYING THE IDENTITY OF EMAIL SENDERS TO IMPROVE EMAIL SECURITY WITHIN AN ORGANIZATION

(71) Applicant: Paubox, Inc., San Francisco, CA (US)

(72) Inventor: Hoala Greevy, San Francisco, CA (US)

(73) Assignee: Paubox, Inc., San Francisco, CA (US)

( * ) Notice: Subject to any disclaimer, the term of this patent is extended or adjusted under 35 U.S.C. 154(b) by 0 days.

(21) Appl. No.: 16/944,091

(22) Filed: Jul. 30, 2020

Related U.S. Application Data

(60) Provisional application No. 62/880,511, filed on Jul. 30, 2019.

(51) Int. Cl.
*H04L 29/06* (2006.01)

(52) U.S. Cl.
CPC ............ *H04L 63/126* (2013.01); *H04L 63/08* (2013.01); *H04L 63/105* (2013.01)

(58) Field of Classification Search
CPC .... H04L 63/08; H04L 63/0105; H04L 63/126
USPC .......................................................... 726/4
See application file for complete search history.

(56) References Cited

U.S. PATENT DOCUMENTS

| | | | | |
|---|---|---|---|---|
| 7,413,085 B2* | 8/2008 | Zager | ................ | G06Q 10/107 209/206 |
| 9,177,293 B1* | 11/2015 | Gagnon | ............ | G06Q 10/107 |
| 9,912,687 B1* | 3/2018 | Wescoe | ................ | H04L 67/42 |
| 2016/0014151 A1* | 1/2016 | Prakash | ............ | H04L 63/1483 726/22 |
| 2018/0278627 A1* | 9/2018 | Goutal | ................ | H04L 51/00 |

OTHER PUBLICATIONS

Ho, Grant, et al. "Detecting credential spearphishing in enterprise settings." 26th {USENIX} Security Symposium ({USENIX} Security 17). 2017. (Year: 2017).*
NPL Search Terms (Year: 2020).*

* cited by examiner

*Primary Examiner* — Syed A Zaidi
(74) *Attorney, Agent, or Firm* — Run8 Patent Group, LLC; Leah Raddatz; Peter Miller

(57) ABSTRACT

One variation of a method for verifying email senders includes: intercepting an email addressed to a target recipient within an organization, the email received from a sender at an inbound email address and including an inbound display name; accessing a whitelist including a verified display name and a set of verified email addresses corresponding to an employee within the organization; characterizing a display name difference between the inbound display name and the verified display name; in response to the display name difference falling below a threshold difference, comparing the inbound email address to the set of verified email addresses; in response to identifying the inbound email address in the set of verified email addresses, authorizing transmission of the email to the target recipient; and, in response to the set of verified email addresses omitting the inbound email address, withholding transmission of the email and flagging the email for authentication.

20 Claims, 4 Drawing Sheets

SYSTEM AND METHOD FOR VERIFYING THE IDENTITY OF EMAIL SENDERS TO IMPROVE EMAIL SECURITY WITHIN AN ORGANIZATION

CROSS-REFERENCE TO RELATED APPLICATIONS

This Application claims the benefit of U.S. Provisional Application No. 62/880,511, filed on 30 Jul. 2019, which is incorporated in its entirety by this reference.

This Application is related to U.S. patent application Ser. No. 15/683,246, filed on 22 Aug. 2017, which is incorporated in its entirety by this reference.

TECHNICAL FIELD

This invention relates generally to the field of email communications and more specifically to a new and useful method for verifying the identity of email senders in the field of email communications.

DESCRIPTION OF THE EMBODIMENTS

Figure 1:
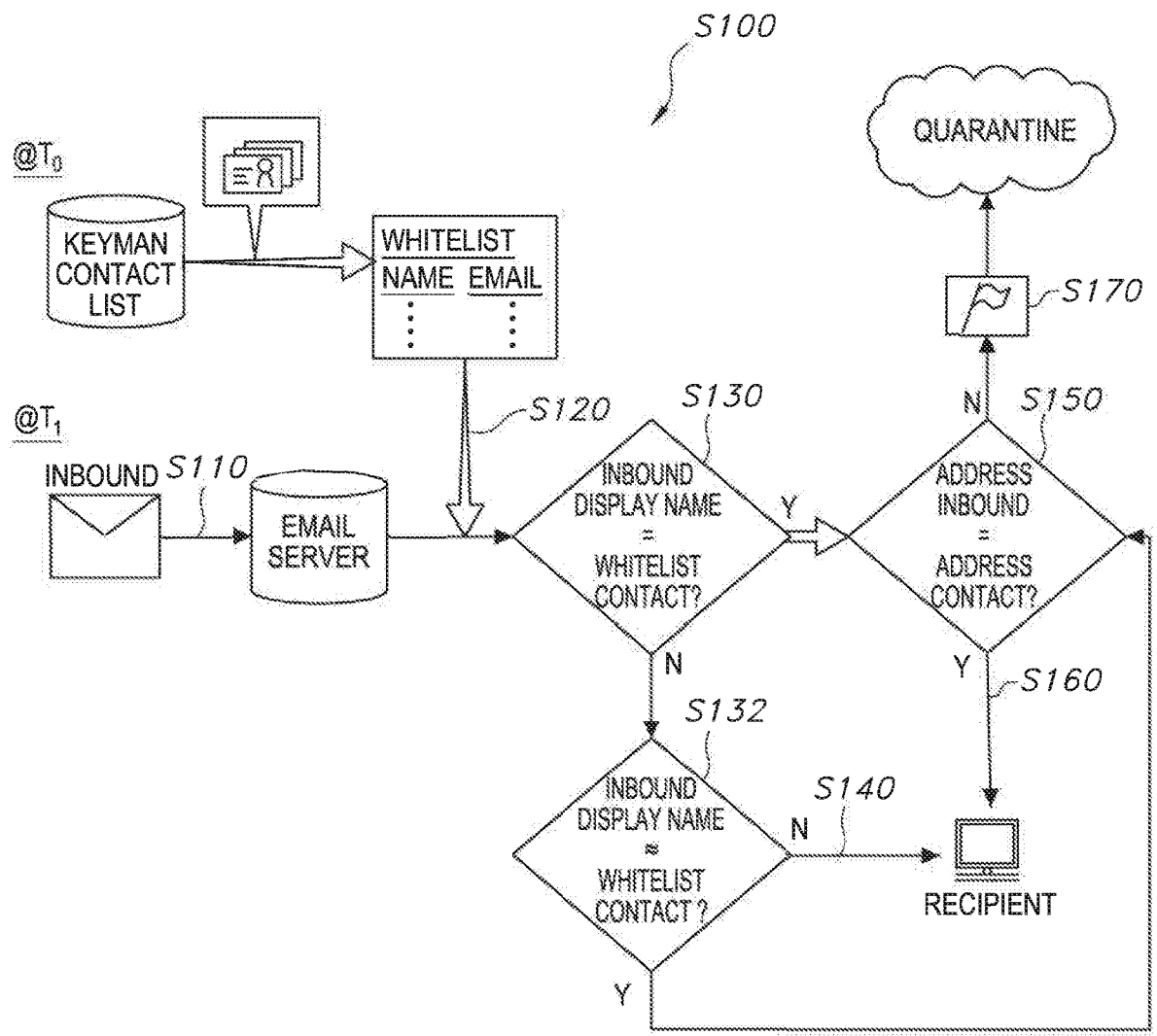
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-4, a method S100 includes: intercepting a first email addressed to a first target recipient within an organization in Block S110, the first email received from a first sender at a first inbound email address and including a first inbound display name; accessing a whitelist comprising a first set of contact information corresponding to a first employee within the organization in Block S120, the first set of contact information including a first verified display name associated with the first employee and a first set of verified email addresses associated with the first employee; characterizing a first display name difference between the first inbound display name and the first verified display name associated with the first employee in Block S130; and, in response to the first display name difference falling below a threshold difference, comparing the first inbound email address to the first set of verified email addresses associated with the first employee in Block S150. The method S100 further includes: in response to identifying the first inbound email address in the first set of verified email addresses, authorizing transmission of the first email to the first target recipient in Block S160; and, in response to the first set of verified email addresses omitting the first inbound email address, withholding transmission of the first email to the first target recipient and flagging the first email for authentication in Block S170.

One variation of the method S100 includes: intercepting a first email addressed to a first target recipient within an organization in Block S110, the first email received from a first sender at a first inbound email address and including a first inbound display name; accessing a first set of contact information corresponding to a first employee within the organization in Block S120, the first set of contact information including a first set of verified email addresses associated with the first employee and a first verified display name associated with the first employee; comparing the first inbound email address to the first set of verified email addresses associated with the first employee in Block S130; and, in response to the first set of verified email addresses excluding the first inbound email address, characterizing a first display name difference between the first inbound display name and the first verified display name associated with the first employee in Block S140. In this variation, the method S100 further includes: in response to the first display name difference exceeding the threshold difference, authorizing transmission of the first email to the first target recipient in Block S160; and, in response to the first display name difference falling below a threshold difference, withholding transmission of the first email to the first target recipient and flagging the first email for authentication in Block 170.

One variation of the method S100 includes: receiving an email addressed to a target recipient within an organization in Block S110, the email received from a sender at an inbound email address and including an inbound display name and an inbound domain; accessing a whitelist containing contact information of a set of employees within an organization in Block S120; comparing the inbound display name contained in the email to verified display names of employees contained in the whitelist in Block S130; and, in response to the inbound display name differing from a display name of each employee in the set of employees identified in the whitelist, sending the email to the target recipient in Block S140. The method S100 also includes, in response to the inbound display name matching a particular name (or display name) of a particular employee in the set of employees identified in the whitelist: comparing the inbound email address with a set of verified email addresses associated with the particular employee in the whitelist in Block S150; in response to the set of verified email addresses containing the inbound email address of the email, sending the email to the target recipient in Block S160; and, in response to the set of verified email addresses omitting the first inbound address, quarantining the email in Block S170. The method S100 can further include, in response to the set of verified email addresses omitting the first inbound address, prompting further investigation of the email by an email administrator.

2. Applications

Generally, Blocks of the method S100 can be executed by a computer system to verify the identity of a sender before passing an email to its designated recipient in order to detect and suppress email spoofing attempts. In particular, email clients (e.g., mobile email clients) may hide sender email addresses and display only display names of these senders in an inbox, email window, and/or reply window. A phisher may leverage hidden sender addresses in such email clients to spoof email recipients within an organization. For example, a spammer may: leverage an organization directory or social network to identify a keyman within the organization (e.g., a CEO, a CTO, a VP, a board member);

create a false email account with a display name identical to the name of this keyman; and deliver an email to an employee or associate of the organization—from this false email account—with an urgent request, such as to provide organization login information or complete a purchase on behalf of the phisher. Because the sender address of this false email account may be hidden in the recipient's email client and because this email contains the keyman's display name, the recipient may perceive the email to be authentic; because the email includes an urgent request, the recipient may also be prompted to act quickly and thus allocate less time to considering authenticity of the request, all of which may result in the recipient completing the action requested in this email on behalf of the phisher.

Therefore, the computer system (e.g., an email server) can execute Blocks of the method to: generate and maintain an approved sender database (hereinafter a "whitelist") containing a keyman profile—including all verified displays names and verified email addresses—for each keyman within an organization; scan this whitelist for a display name of a keyman that matches an inbound display name attached to an inbound email into the organization; and pass this inbound email on to its designated recipient within the organization if no keyman profile for keymen in the organization contains a display name that matches the inbound display name of the inbound email. However, if the computer system identifies a particular keyman profile that contains a name (or display name) that matches the display name attached to the inbound email, the computer system can: deliver this inbound email to its recipient if the email address of the inbound email matches the email address associated with the matched display name in this particular keyman profile; and otherwise quarantine the email for additional investigation (e.g., by an email administrator within the organization) before delivery to the designated recipient. For example, the computer system can notify the email administrator of the flagged email—which represents a possible spoofing attempt on the organization—by: inserting a link to the email into an security alert feed at an information security operations center (or "ISOC"); or inserting hyperlinks to discard or deliver the email and contents of the email into an email notification and then forwarding this email notification to the email administrator's email inbox. The computer system can then selectively deliver the inbound email to its designated recipient or discard the email based on the email administrator's response.

The computer system can thus execute Blocks of the method to: protect the personal security of a select group of keymen within an organization by blocking emails impersonating these keymen; reduce email spoofing within the organization; and increase confidence and trust of employees working under the select group of keymen by verifying authenticity of emails containing display names indicating these keymen to these employees.

3. Example

In one example, during a setup period, a particular employee at an organization may load her contact information into a keyman profile and upload this contact card to the computer system via a web portal. For example, the keyman profile can include work, personal, and/or education email addresses and related display names and work and personal phone numbers. Alternatively, the employee can send test emails from her work, personal, education, and/or other email accounts to the computer system, and the computer system can strip email addresses and related display names from these test emails and load this contact information into a keyman profile for the particular employee. The computer system can similarly interface with other employees, associates, or keymen of the organization to generate a corpus of keyman profiles for the organization. The computer system can then compile these keyman profiles into a whitelist for the organization, such as including one keyman profile for each executive, board member, vice president, and upper-level manager of the organization.

Later, upon receiving an email from a sender (e.g., outside of the organization), the computer system can: determine whether a display name of the inbound email matches an employee name or display name contained in any one keyman profile within the whitelist. If the display name of the inbound email matches the employee name or display name within a particular keyman profile, the computer system can compare a sender email address of the inbound email with a verified email address of the particular employee contained in the particular keyman profile. Then, if the sender email address matches one verified email address in this particular keyman profile, the computer system can deliver (or "release") the email to a recipient specified in the inbound email. However, if the sender email address does not match a verified email address in the particular keyman profile, the computer system can: withhold the email from the recipient; quarantine the email, such as by diverting the email to a quarantine database; and notify an email administrator of the quarantined email. The email administrator may further investigate validity of the email and its sender and then determine whether to deliver the quarantined email to the recipient.

To notify the email administrator of the quarantined email, the computer system can: generate a notification email containing a hyperlink to access the quarantine database within a web portal; and deliver the notification email to the email administrator. Upon receiving the notification email, the email administrator can: select the hyperlink to automatically open a web browser and to navigate to the web portal containing the quarantine database; view the quarantined email to determine the validity of the sender; and select whether to deliver the quarantined email to the recipient or discard the quarantined email based on results of her investigation. Additionally and/or alternatively, the computer system can: populate a notification email with contents and sender data of the inbound email and a hyperlink to release the email into the notification email; deliver the notification email to the email administrator; and automatically deliver the email to the recipient upon selection of this hyperlink by the email administrator (e.g., "one-click" release). Yet alternatively, the computer system can generate an alert—linked to this quarantined email—and insert this alert into a security alert feed at an ISOC affiliated with the organization.

4. Onboarding & Whitelist

The computer system interfaces with employees, associates, or other representatives of an organization to access and aggregate contact information for these employees (e.g., via a web portal) and leverages contact information provided for these employees to investigate the validity of email senders sending emails to employees within the organization.

In one implementation, an email administrator within an organization identifies a select group of "keyman" or "very important people" within the organization who exhibit greater risk of email spoofing. For example, the email administrator may generate a list of organization keymen including a CEO, a COO, a president, vice presidents, and senior managers. The computer system can then verify that inbound emails that include display names that match (or are otherwise similar to) names of these keymen are inbound from email addresses associated with these keyman before releasing these emails to their designated recipients, as described below. Therefore, the computer system can interface with an email administrator during a setup period to aggregate contact information of keymen in the organization and to compile these contact information into a whitelist of verified contact information for these keymen within the organization.

In another implementation, the computer system interfaces with keymen in an organization directly to access contact information of these keymen. For example, the CEO of a first company may upload her contact information, including both work and personal contact information (e.g., name, email addresses, phone numbers). The computer system can then receive this contact information and generate a keyman profile for this CEO. Therefore, at a future time, the computer system can verify inbound emails containing display names similar or identical to the CEO's names based on the CEO's keyman profile. In particular, upon receiving an email with a display name and from a particular email address, the computer system can: access the whitelist containing keyman profiles for a group of employees included in the whitelist; and search for a keyman profile containing a name or display similar or identical to the display name contained in the inbound email. Then, upon identifying the CEO's keyman profile that contains a name that matches the display name of the inbound email, the computer system can compare the sender email address of the inbound email to a set of verified email addresses contained in the CEO's keyman profile. If the sender email address matches a verified email address in the CEO's keyman profile, the computer system can verify the sender as the CEO and deliver the email to its designated recipient. Otherwise, the computer system can flag and quarantine this email.

In one variation, the whitelist is generated manually for a select group of employees or associates within the organization and is uploaded to the computer system via a web portal. For example, the computer system can initially receive a manually generated whitelist of contact information for a select group of employees, and at a later time incorporate contact information (e.g., names, email addresses, display names) of additional employees in the organization as emails are sent to and/or sent by these additional employees and approved by an email administrator, as described below.

In one variation, the computer system can add all email addresses within a particular domain to the whitelist for an organization. For example, the computer system can whitelist all email addresses of employees within an organization domain (e.g., Company ABCD with an email domain "@ABCD.com"). Therefore, the computer system can automatically authorize transmission of emails sent from email addresses within the organization domain without further checks for authenticity according to the method, thereby reducing overhead and computational power scanning these internal emails for spoofing attempts.

5. Inbound Email Check

Once the whitelist is generated, the computer system can receive (or "intercept") inbound emails from senders and verify the validity of these senders based on this whitelist before releasing these inbound emails to their designated recipients. In particular, the computer system can receive an inbound email from an inbound email address (hereinafter a "sender email address") and extract contact information from the inbound email, including: a display name of the sender (e.g., a name of the sender that is visible to a recipient of the email); a username of the sender email address (e.g., a local component of the sender email address); and a domain of the sender email address. The computer system can then: compare the display name to verified names of employees contained in the whitelist; and compare the sender email address and/or its components (e.g., the username) to verified email addresses contained in keyman profiles in the whitelist if the display name of the sender email address matches the name or display name of a keyman profile in the whitelist.

For example, upon receiving an email from a sender at a sender email address, the email including a display name and designating a target recipient, the computer system can: access a whitelist including names of employees at an organization; in response to the whitelist including a verified name of an employee that matches the display name included in the email, compare a set of verified email addresses corresponding to the employee and included in the whitelist to the sender email address; in response to the whitelist containing the sender email address, deliver the email to the target recipient; in response to the whitelist omitting the sender email address, quarantine the email in a quarantine database; and notify an email administrator of the email for further investigation. Therefore, the computer system can deliver emails sent with display names excluded from the whitelist without further investigation and flag emails with display names corresponding to employees within an organization for authentication in order to ensure the legitimacy of emails allegedly sent from key employees within the organization.

In one variation, the computer system can initially access the whitelist to compare a sender email address with verified email addresses of employees in the whitelist. If the sender email address exactly matches a verified email address of an employee in the whitelist, the computer system can automatically authenticate the email and authorize transmission of the email to a designated target recipient. For example, the computer system can: intercept an email addressed to a target recipient within an organization, the email received from a sender at a sender email address and including an inbound display name; access a set of contact information corresponding to an employee within the organization, the set of contact information including a set of verified email addresses associated with the employee and a verified display name associated with the employee; compare the inbound email address to first set of verified email addresses associated with the employee. Then, in response to identifying the sender email address in the set of verified email addresses, the computer system can authorize transmission of the email to the target recipient. However, in response to the set of verified email addresses excluding the sender email address, the computer system can further compare the inbound display name with the verified display name to verify validity of the sender. Therefore, the computer system can automatically deliver emails sent from email addresses included in the whitelist without further investigation and further investigate emails sent from email addresses excluded from the whitelist.

In one variation, upon receiving a new email, the computer system can initially access a blacklist, containing email addresses of known fraudulent senders, to automatically withhold and discard emails from these email addresses. For example, the computer system can receive an email from an email address; access a blacklist containing blocked email addresses; in response to the blacklist containing the email address as a blocked email address, automatically withhold the email from a designated recipient and discard the email. Therefore, the computer system performs no further investigation if an email address is already contained in the blacklist and does not notify the email administrator, thus increasing efficiency of email investigation and reducing a workload of the email administrator. If the email address is not found on the blacklist, the computer system can implement the method S100 described above to continue the investigation process.

6. Sender Verification

The computer system can confirm email legitimacy and verify the identity of a sender by checking a display name visible to a user viewing the email and/or an email address from which the email is sent. For example, upon receiving an email from a sender at a first email address, the computer system can: identify the display name displayed in the email; access the whitelist containing contact information of a select group of employees within an organization; in response to the display name matching a verified name of a particular employee in the whitelist, compare the first email address to a set of verified email addresses contained in the whitelist for the particular employee; in response to the first email address matching a verified email address within the set of email addresses contained in the whitelist, deliver the email to a recipient as designated in the email; in response to the first email address not matching a verified email address within the set of email addresses, flag the email for quarantine; and notify an email administrator of the email for additional investigation.

Therefore, the computer system can quarantine emails including inbound display names matching and/or similar to display names included in the whitelist if the email address from which the email was sent is not also included in the whitelist. The computer system can then notify an email administrator of the quarantined email to further investigate the validity of the sender. For example, upon receiving an email with a display name matching an employee contained in the whitelist but from an email address not contained in the whitelist, the computer system can: quarantine the email in an email quarantine database and notify an email administrator of the email for further investigation. The computer system can then receive inputs from the email administrator to determine whether to deliver the email to a designated recipient.

The computer system can notify the email administrator of a quarantined email from an unverified email address with a display name of an employee within an organization, and the email administrator can further investigate the validity of this sender. The email administrator may manually investigate the validity of the email address and the sender to confirm that the email is legitimate and not a phishing attempt by corroborating with the employee corresponding to the display name contained in the email. Alternatively, the email administrator may read the original email and determine its validity based on content contained in the email.

The computer system can characterize difference (or "display name differences") between inbound display names and verified display names included in the whitelist to identify inbound display names that closely resemble (or "imitate") display names of employees included in the whitelist. For example, the computer system characterize a display name difference on a scale of zero percent (e.g., inbound display name equivalent to verified display name) to 100 percent (e.g., no overlap between inbound display name and verified display name). In another example, the computer system can characterize the display name difference as either "low", "intermediate", and/or "high." The computer system can then leverage this display name difference to assess whether a spoofing attempt is possible and/or likely and thus whether to further investigate sender validity.

6.1 Similar Display Names

In one variation, the computer system can check whether the inbound display name included in the email approximates a verified display name included in the whitelist. In this variation, the computer system can leverage pattern matching techniques to extract differences between characters (e.g., combination, sequence, quantity) in the inbound display name and the verified display name. Based on these differences, the computer system can characterize a display name difference between the inbound display name and the verified display name and leverage this display name difference to extract insights into sender validity.

In one variation, the computer system can identify inbound display names closely resembling verified display names, such as an inbound display name corresponding to a different spelling of a verified display name (e.g., "Sarah" versus "Sara"). For example, the computer system can: intercept an email addressed to a target recipient within an organization, the email from a sender at an inbound email address and including an inbound display name of "John Troy"; access a whitelist including contact information corresponding to a first employee within the organization, the whitelist including a verified display name of "Jon Troy" and a verified email address corresponding to the first employee. The computer system can leverage pattern matching techniques to characterize a display name difference between "John Troy" and "Jon Troy" as a "low" display name difference indicating the inbound display name is similar to the verified display name of the first employee. Based on this "low" display name difference, the computer system can further investigate validity of the sender of the email by checking whether the inbound email address exactly matches the verified email address of the first employee. Additionally and/or alternatively, for a second email including an inbound display name of "Jessica Roy", the computer system can again leverage pattern matching techniques to characterize a display name difference between "Jessica Roy" and "Jon Troy" as a "high" display name difference indicating the inbound display name is distinct from the verified display name in the whitelist and therefore less likely to be a spoofing attempt of the first employee. Therefore, in this example, the computer system can authorize transmission of the second email without further investigation—with respect to the first employee. However, the computer system can similarly compare the inbound display name to other verified display names compared in the whitelist before authorizing transmission of the second email to a target recipient.

In one variation, the computer system can identify inbound display names corresponding to partial extractions of verified display names in the whitelist, such as an inbound display name corresponding to a set of initials extracted from a verified display name (e.g., "Jon Troy" versus "J Troy", "Jon T", and/or "JT"). For example, the computer system can: intercept an email from a sender at an inbound email address and including an inbound display name of "JT"; access a whitelist including contact information corresponding to a first employee and including a verified display name of "Jon Troy" and a verified email address corresponding to the first employee. The computer system can leverage pattern matching techniques to characterize a display name difference between "J Troy" and "JT" of twenty percent. Therefore, to characterize the display name difference, the computer system can identify whether the inbound display name corresponds to an abbreviated and/or shortened version of the verified display name included in the whitelist.

In one variation, the computer system can weight different characters within display names differently to characterize the display name difference. For example, in the preceding example, the computer system can: assign a weight of twenty percent to a first character of the forename; assign a weight of twenty percent to a first character of the surname; and distribute a weight of sixty percent evenly among each of the other characters in the verified display name. The computer system can then characterize the display name difference according to the assigned weights, such that the first characters of both the forename and the surname more heavily impact the display name difference than the other characters in the verified display name.

In one variation, the computer system can identify inbound display names corresponding to rearrangements of verified display names in the whitelist, such as an inbound display name corresponding to an inverse (or "reverse") of a verified display name in the whitelist (e.g., "Jon Troy" versus "Troy Jon"). For example, the computer system can extract a forename and a surname from the inbound display name and compare this to a verified forename and a verified surname of the verified display name in the whitelist. If these do not match, the computer system can compare the forename of the inbound display name to the verified surname of the verified display name and the surname of the inbound display name to the verified forename of the verified display name. If these match, the computer system can identify overlap between the inbound display and the verified display name. Therefore, to characterize the display name difference, the computer system can identify whether the inbound display name corresponds to a rearrangement of the verified display name.

6.2 Nicknames

In one variation, the computer system can identify inbound display names corresponding to common name variations (or "nicknames") associated with verified display names (e.g., "John" versus "Johnny" or "Jack"). The computer system can leverage pattern matching techniques to identify nicknames corresponding to minor changes in display names, such as an inbound display name of "Johnny" compared to a verified display name of "John." For nicknames corresponding to less obvious changes, the computer system can explicitly compare the inbound display name to a list of nicknames corresponding to the verified display name. For example, during onboarding, the computer system can prompt a user to input a set of nicknames for each employee in the whitelist. Later, the computer system can compare an inbound display name to both a verified display name and a set of nicknames assigned to the verified display name.

In another example, the computer system can access a name graph to identify a set of nicknames corresponding to a verified display name of an employee. More specifically, in response to intercepting an email received from a first sender at an inbound email address and including an inbound display name, the computer system can: access the whitelist including a verified display name and a set of verified email addresses corresponding to an employee within an organization; and characterize a display name difference between the inbound display name and the verified display name. To characterize the display name difference, the computer system can access a name graph including a corpus of names distributed about the graph based on correlations between names, such that a set of names proximal and/or surrounding a particular name are highly correlated to the particular name, thus possibly representing nicknames (or related names) of the particular name. In this example, the computer system can: access the name graph; search the name graph for the verified display name (e.g., a forename); and extract a set of names within a set radius of the verified display name within the name graph. The computer system can then compare the inbound display name to each name in the set of names extracted from the name graph. Therefore, the computer system can characterize the first display name difference based on whether the inbound display name matches a name in the set of names extracted from the name graph.

6.3 Symbols Imitating Authentic Characters

In one variation, the computer system can identify whether an inbound display name includes unauthentic characters excluded from verified display names (e.g., "John" versus "John). For example, the computer system can compare a set of characters corresponding to the inbound display name to a set of authentic characters corresponding to a verified display name. In response to identifying a first number in replacement of a first letter (e.g., a "o" in replacement of an "o") in the inbound display name, the computer system can characterize the display name difference based on this replacement. Alternatively, in one variation, in response to identifying symbols (e.g., numbers) within the inbound display name in replacement of authentic characters (e.g., letters) within the verified display name, the computer system can automatically withhold transmission of the email and flag the email for authentication.

6.4 Base64 Encoding

In one variation, the computer system can identify different encoding methods within the inbound display name. The computer system can characterize the display name difference based on a type of encoding identified. For example, the computer system can identify an inbound display name encoded in Base64 and automatically flag this email for authentication by the email administrator. Alternatively, the computer system can translate the inbound display name accordingly and compare this inbound display name to a verified display name in the whitelist.

In one variation, the computer system can implement Base64 decoding and Base32 decoding to compare the inbound display name to the verified display name. For example, the computer system can first translate an inbound display name according to Base64 decoding. If, based on the translation, the display name difference exceeds the threshold display name difference and an inbound email address does not match a verified email address corresponding to the verified display name, the computer system can withhold transmission of the email and flag the email for authentication. If, however, the display name difference falls below the threshold display name difference, the computer system can translate the inbound display name according to Base32 decoding and compare this translated inbound display name to the verified display name accordingly.

7. Email Quarantine

In one variation, the computer system can deliver an email notification to the email administrator including a hyperlink that, when selected by the email administrator, automatically opens a web browser with access to a web portal and the quarantined email for investigation. The email administrator may investigate the quarantined email and determine whether the sender is legitimate. Upon receiving verification of the sender by the email administrator via the web portal, the computer system can deliver the email to a designated recipient. Alternatively, if the email administrator determines the sender is not authentic, the computer system can withhold the email from the designated recipient.

In one variation, the computer system can deliver an email notification to the email administrator including: the original quarantined email (e.g., the text of the quarantined email in the content of the notification email or via a hyperlink that opens a web browser that downloads the quarantined email); a hyperlink that, when selected, triggers the computer system to deliver the quarantined email to a designated recipient; and a hyperlink that, when selected, triggers the computer system to discard the quarantined email. Additionally, the notification email can include a hyperlink that, upon selection, triggers the computer system to discard the quarantined email and add a sender of the quarantined email to the blacklist.

Alternatively, the computer system can notify the email administrator of a quarantined email and enable the email administrator to deliver or withhold the email. For example, the computer system can: notify the email administrator of a new quarantined email; prompt the email administrator to investigate the validity of the email and sender; prompt the email administrator to either forward the email to a designated recipient or discard the email.

In one variation, a particular email address may send out multiple emails to multiple recipients within an organization. In this variation, the computer system can combine these emails into one notification to the email administrator. For example, in response to receiving multiple emails from a particular sender with a display name found in the whitelist but from an email address not contained in the whitelist, the computer system can: flag each email from this sender for quarantine; merge these emails into a single email notification and deliver the email notification to the email administrator; and receive verification or denial of these emails or a subset of these emails from the email administrator and distribute these emails or withhold these emails accordingly.

7.1 Quarantine Portal

Figure 4:
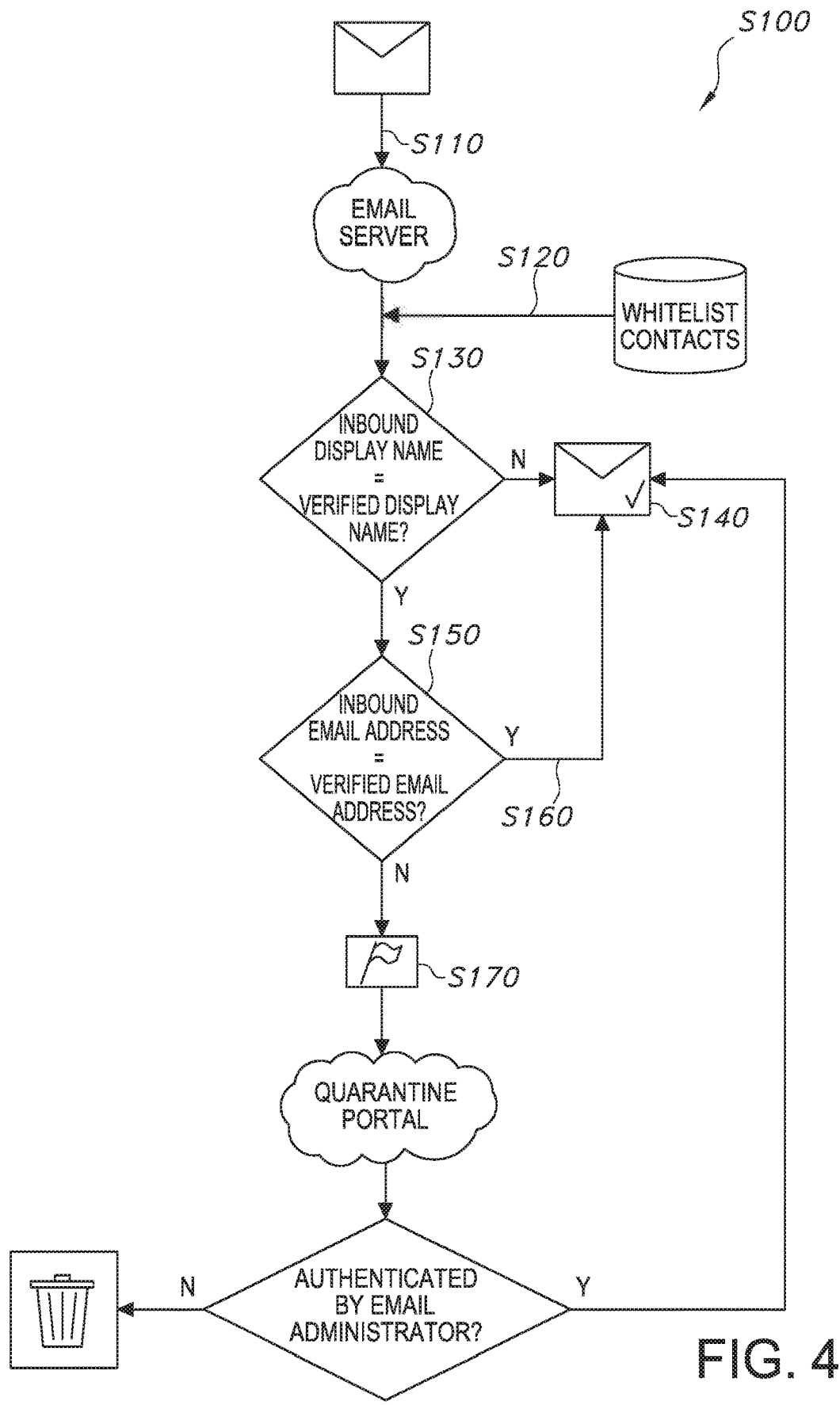
FIG. 4 is a schematic representation of the method.

In one variation, as shown in FIG. 4, the computer system can withhold flagged emails for further investigation of sender validity within an online portal (or "quarantine portal") accessible by the email administrator. The email administrator may access an instance of the quarantine portal (e.g., via a native application operating on her mobile phone, at a webpage operating on her laptop computer) to view, sort, and/or verify authenticity of emails flagged by the computer system.

Upon flagging an email for authentication, the computer system can automatically add the email to a quarantined email list viewable to the email administrator within the quarantine portal. The email administrator may access the quarantine portal to view the updated quarantined email list and select the email to view an inbound email address and an inbound display name associated with the email. The email administrator may then investigate authenticity and, upon determination of an authentic sender, transmit authentication of the email to the computer system (e.g., via selection of a corresponding "authenticate" hyperlink). Alternatively, upon determination of an unauthentic sender (e.g., a spoofing attempt), the email administrator may transmit confirmation of a spoofing attempt to the computer system (e.g., via selection of a corresponding "spoof attempt" hyperlink). In response to receiving authentication of the email from the email administrator, the computer system can authorize transmission of the email to a target recipient designated in the email. Alternatively, in response to receiving confirmation of an unauthentic sender, the computer system can withhold transmission of the email to the target recipient and/or discard the email.

In one variation, the computer system can deliver an email notification to the email administrator including a hyperlink that, when selected by the email administrator, automatically opens a web browser with access to a web portal containing an email quarantine database. Within the web portal, the email administrator may view all emails flagged for authentication by the computer system. The computer system can then receive inputs from the email administrator via the web portal indicating whether to authorize transmission of quarantined emails to target recipients or discard these emails. For example, the computer system can serve an email notification including a hyperlink to an email administrator for a new quarantined email. Upon selection of the hyperlink by the email administrator, the computer system can enable viewing of the quarantine portal at which the email administrator may view the quarantined email and select whether to deliver or discard the quarantined email. The computer system can receive this selection and act accordingly. Therefore, the computer system can automatically inform the email administrator of a new quarantined email available within the quarantine portal, thus enabling the email administrator to quickly and more easily access the quarantine portal when a new email is added to the quarantine list, such that emails from authentic (e.g., legitimate) senders may be quickly authenticated and delivered to their designated target recipients.

In one variation, the email administrator may sort emails within the quarantined email list by sender, email address, order received (e.g., timestamp), and/or reasons for flagging in order to prioritize investigation of particular emails and/or more efficiently investigate these emails. For example, the email administrator may sort the quarantined email list by inbound email address and select whether to deliver or discard a set of emails, within the quarantined email list, sent from a particular inbound email address. More specifically, the email administrator may determine that each email, in the set of emails, sent from this email address includes a different display name. Thus, the email administrator may determine that this particular inbound email address corresponds to an unauthentic sender. Additionally, the email administrator may input a selection indicating addition of this particular email address to the blacklist.

In one variation, the computer system can automatically sort emails within the list of quarantined emails when adding a new email to this list. In this variation, the computer system may sort emails within the list of quarantined emails according to priority (e.g., sender priority, target recipient priority, order received). For example, in response to flagging an email for authentication, the computer system can access the whitelist to extract a rank (e.g., Rank I, Rank II, and Rank III) of an employee associated with the inbound email address and/or display name of the email, the rank corresponding to a position of the employee within the organization. In response to the whitelist specifying a high rank (e.g., corresponding to the CEO of the organization), the computer system can automatically insert the email at a top of the quarantined email list to enable prompt investigation of this email.

In one variation, the email administrator can input a selection within the quarantine portal indicating that the email administrator may be unsure of whether an inbound email address corresponds to an authentic sender or an unauthentic sender. Upon receiving this selection, the computer system can generate a notification requesting confirmation of validity of the email and transmit this notification to an employee (e.g., at a verified email address) from which the email was allegedly sent. Upon receiving confirmation of validity of the email from the employee, the computer system can automatically authorize transmission of the email to a target recipient. Alternatively, upon receiving confirmation of an unauthentic sender from the employee, the computer system can automatically discard the email.

8. Authenticated Email

Upon receiving verification of an email from an email address initially flagged for quarantine (not found in the whitelist) from the email administrator via the web portal, the computer system can deliver the email to the original recipient. Alternatively, the computer system can notify the email administrator of the email flagged for quarantine, and the email administrator may manually forward the email to a target recipient upon verification of the sender or withhold the email if the sender is not verified.

In one variation, the computer system can update the whitelist to include a verified email address for an employee associated with this email address. For example, the computer system can: receive verification of an email from an email address initially flagged for quarantine from the email administrator via the web portal; deliver the email to a designated recipient; and add the email address to the whitelist. Therefore, at a future time, when an employee associated with this email address sends an email, the computer system will find the email address in the whitelist and not initiate further investigation of validity, thus decreasing latency between sending emails from this email address and receiving these emails, decreasing a workload of the email administrator, and eliminating the need to manually upload new contact information.

In one variation, the computer system can include a verified notification to the recipient in the email to communicate to the recipient that the email is from a verified sender. For example, the computer system can: receive verification of the email from the email administrator via the web portal, add a tag (e.g., a notification) in the email indicating the email has been verified and the sender is legitimate, and deliver the email to a designated recipient. Therefore, the computer system can increase confidence of the recipient that the sender and the contents contained in the email are legitimate. Thus, the computer system can leverage the ability to verify the identity of email senders to increase trust and confidence of both senders and recipients of emails, and therefore enable employees to engage with or act on contents contained in emails more efficiently.

8.1 Authentic Email Notification

In one variation, upon receiving verification of the email sender from the email administrator, the computer system can generate a notification for transmission to the target recipient of the email indicating authentication of the email sender. For example, the computer system can: intercept an email addressed to a target recipient, the email from a first sender at an inbound email address and including an inbound display name. Upon inspection of the inbound display name and the inbound email address, the computer system can withhold transmission of the email to the target recipient and flag the email for authentication by the email administrator. Later, upon receiving authentication of the email from the email administrator, the computer system can: generate a notification indicating authentication by the email administrator of the email sender; insert the notification into a bottom portion of the email; and authorize transmission of the email to the target recipient. Therefore, the computer system can enable email recipients to feel confident that email senders are legitimate and thus respond accordingly and confidently to emails from verified senders.

9. Sender Error: Invalid Email/Spoofing Attempt

The computer system may receive confirmation from the email administrator via the web portal that an email from a particular email address is not verified, invalid, or a spoofing attempt. Upon receiving this confirmation, the computer system can withhold the email from its designated recipient and instead discard the email.

In one variation, the computer system can generate a notification detailing this spoof attempt for delivery to the target recipient of the discarded email. Additionally and/or alternatively, the computer system can generate a notification detailing this spoof attempt for delivery to an employee associated with the verified display name copied or imitated in the spoofing attempt by the email sender.

9.1 The Blacklist

In one variation, the computer system can additionally add an email address to a database containing email addresses of phony senders in near real-time upon receiving confirmation from the email administrator that the email address is invalid, not verified, or a spoofing attempt. Later, the computer system can access this list when checking other incoming emails. For example, the computer system can: at a first time, receive a first email from a first sender addressed to a first recipient, the first email containing a display name and sent via a first email address with a first display name and at a first domain; access a whitelist containing a set of verified email addresses; in response to the whitelist containing the display name, comparing the first email address to a verified email address in the set of verified email addresses associated with the display name; in response to the verified email address not matching the first email address, quarantine and flag the first email for further investigation; and notify the email administrator. In response to receiving a denial of the first email from the email administrator via a web portal, the computer system can record the first email address to a blacklist representing blocked email addresses associated with phishing schemes; at a second time, receive a second email sent via the first email address; access the blacklist to search for the first email address; and, in response to the blacklist containing the first email address, automatically quarantine the second email and withhold the second email from a designated recipient. Therefore, by populating a blacklist and searching for email addresses in the blacklist before checking the whitelist, the computer system can: minimize notifications sent to the email administrator; decrease workload of the email administrator by eliminating notifications from previously denied senders (e.g., known phishing emails); minimize latency between the sending of an authentic email by an unverified email address and delivery to the recipient.

The computer system can generate a unique blacklist for each organization (e.g., company) based on denied emails sent to employees of the organization. Alternatively, the computer system can access a global blacklist containing denied email addresses from multiple organizations to further reduce latency between sending of legitimate emails and receiving these emails. For example, the computer system can receive confirmation from the email administrator via the web portal that an email from a particular email address is malicious (e.g., a spoofing attempt). Upon receiving this confirmation, the computer system can: withhold the malicious email from a designated recipient; discard the malicious email; and add the sender email address from this malicious email to a blacklist containing email addresses associated with malicious spoofing emails. For example, the computer system can populate this blacklist with email address associated with malicious spoofing emails inbound to multiple (e.g., many, thousands of) organizations and automatically discard inbound emails from any sender email address on this blacklist to recipients within all of these organizations. Therefore, at a future time, in response to receiving a new inbound email, the computer system can check the blacklist for an email address that matches the sender email address of this new inbound email and then automatically discard this new inbound email responsive to detecting such as a match.

In one variation, the computer system can populate the blacklist by adding email addresses that have sent multiple emails exhibiting different display names. For example, the computer system can: at a first time, receive a first email with a first display name from a first email address; access the blacklist for the first email address; in response to the blacklist omitting the first email address, access the whitelist to compare the first display name in the first email with verified employee names contained in the whitelist; in response to the whitelist containing a first verified employee name corresponding to the first display name in the first email, compare the first email address with a set of verified email addresses corresponding to the first verified employee name; in response to the first email address not matching a verified email address contained in the whitelist, quarantine the first email; notify the email administrator; receive a denial of the first email from the email administrator via a web portal; at a second time, receive a second email with a second display name from the first email address; in response to the second display name not matching the first display name, notify the email administrator; and add the first email address to the blacklist.

10. Ranking Users

In one variation, the computer system can screen emails differently depending on the type or level of the employee (e.g., CEO, manager, entry-level employee) with which the display name in an email is associated. For example, an organization may collect contact information for all employees and upload this contact information to the computer system via a web portal and specify employee rankings within the organization. The computer system can: at a first time, receive the whitelist for the organization containing contact information of employees at the company; assign each employee a threat level (e.g., low or high threat level, Level I, II, or III) based on employee rankings at the organization as specified in the whitelist; at a second time, receive an email containing a first display name and addressed to a first recipient; access the whitelist of the organization to check for the first display name; in response to the first display name corresponding to the CEO of the company, the CEO previously assigned a high threat level, quarantine the email and withhold the email from the first recipient; flag the email for further investigation and notify the email administrator. If an email administrator determines that the email is legitimate, the computer system can then receive verification of the email from the email administrator and deliver the email to the recipient.

Alternatively, upon receiving an email with a display name corresponding to a lower level employee within the company and from a first email address, the computer system can: access the whitelist of the organization to check for the display name; in response to the display name corresponding to an entry level employee of the company, the entry level employee previously assigned a low threat level, check the whitelist to compare the first email address to a verified email address of the entry level employee; in response to the first email address not matching the verified email address of the entry level employee, flag the email as an unverified email from an unverified sender; and deliver the email to a designated recipient including an unverified sender notification.

Therefore, in this variation, the computer system can verify email senders for all employees within an organization while allocating additional resources to higher ranking employees (e.g., CEO, COO, president) and minimizing resources allocated to lower ranking employees. For example, an organization may define three employee levels (e.g., Level I, II, and III) and assign employees to these levels based on employee position with the organization. The computer system can then implement different email sender review methods based on the level of the employee associated with the display name of an email. Thus, the computer system can: upon receiving an email from a first sender with a display name corresponding to a Level I employee, automatically quarantine the email and notify the email administrator; upon receiving an email from a first sender with a display name corresponding to a Level II employee, check the whitelist for the email address associated with the email, and quarantine the email and notify the email administrator if the email address is not found on the whitelist; upon receiving an email from a first sender with a display name corresponding to a Level III employee: check the whitelist for the email address associated with the email, flag the email as sent from an unverified sender if the email address is not found on the whitelist, and deliver the email to a designated recipient including a notification of the unverified sender. In this variation, the computer system enables organizations to set minimum thresholds for which investigation of email senders is required.

11. Common Names

In one variation, the computer system can verify and quarantine emails from senders with exact or similar names as employees included in the whitelist and, upon further investigation and approval by the email administrator, add the contact information for these senders to the whitelist. Upon serving a notification of a quarantined email to the email administrator, the computer system can receive a secondary verification of the email address indicating a verified contact other than the verified employee contained in the whitelist.

For example, a vendor for the organization may have a name similar or identical to the name of a keyman (e.g., the CEO) within the organization. In this example, the computer system can: receive an email from a sender with a display name "James Smith" and with a first email address including a first username "J.Smith" and a first domain; access a whitelist of an organization; find a keyman profile with a name "James Smith" in the whitelist and with a second email address including a second username "JSmith" and a second domain; and quarantine the email and notify the email administrator. In response to receiving a secondary verification of the email from the email administrator as from a vendor of the organization and not the CEO, the computer system can; add the vendor to the whitelist; and deliver the email to its designated recipient. Therefore, the computer system can verify and deliver emails from legitimate senders with similar or exact names as employees in the whitelist, and incorporate their contact information into the whitelist to prevent the delay or quarantine of emails from these senders.

12. Whitelist Update

In one variation, the computer system can update the whitelist over time in response to verification—by the email administrator or other security analyst—of flagged or quarantined emails sent from email addresses not previously contained in keyman profiles in the whitelist.

For example, the computer system can: quarantine an inbound email containing a display name contained in a particular keyman profile in the whitelist but sent from an email address not contained in this particular keyman profile; and notify the email administrator of this quarantined email, such as in an email quarantine database or security alert feed. Upon verification of the sender and release of the first email to a designated recipient by the email administrator, the computer system can prompt the email administrator to indicate whether the sender email address from this released email corresponds to a new email address for the particular keyman; if so, the computer system can add the sender email address to the particular keyman profile associated with this particular keyman in the whitelist.

Later, upon receiving a second inbound email containing this same display name and identifying this new email address, the computer system can verify this second inbound email based on the updated keyman profile of this particular keyman and deliver this second inbound email to its designated recipient without prompting further investigation by the email administrator.

Therefore, during a setup period, the computer system can aggregate and indicate a set of contact information for a first select group of employees (e.g., leaders and managers within an organization), generate initial keyman profiles for these employees, and generate a whitelist containing these keyman profiles. The computer system can then intelligently add new contact information to these keyman profiles as the new contact information for these keymen are verified—ad hoc—by the email administrator or other security analyst over time.

The computer system can also add sender email addresses—verified by the email administrator or security analyst but not associated with a keyman in the organization—to the whitelist. For example, the computer system can: receive an email from an email address with a domain external to the organization; access a whitelist for this organization; and implement methods and techniques described above to check the sender email address and display name for this inbound email. If the computer system determines that the display name in this inbound email matches a display name in a keyman profile in the whitelist but the sender email address does not match a verified email address in a corresponding keyman profile in the whitelist, the computer system can flag the email for further investigation and notify the email administrator of the email. If the email administrator then verifies that the email is valid but not sent by a keyman in the organization, the computer system can generate a new verified sender profile containing this display name and sender email address and add this new verified sender profile to the whitelist.

13 Variation: Exact Email Address

Figure 2:
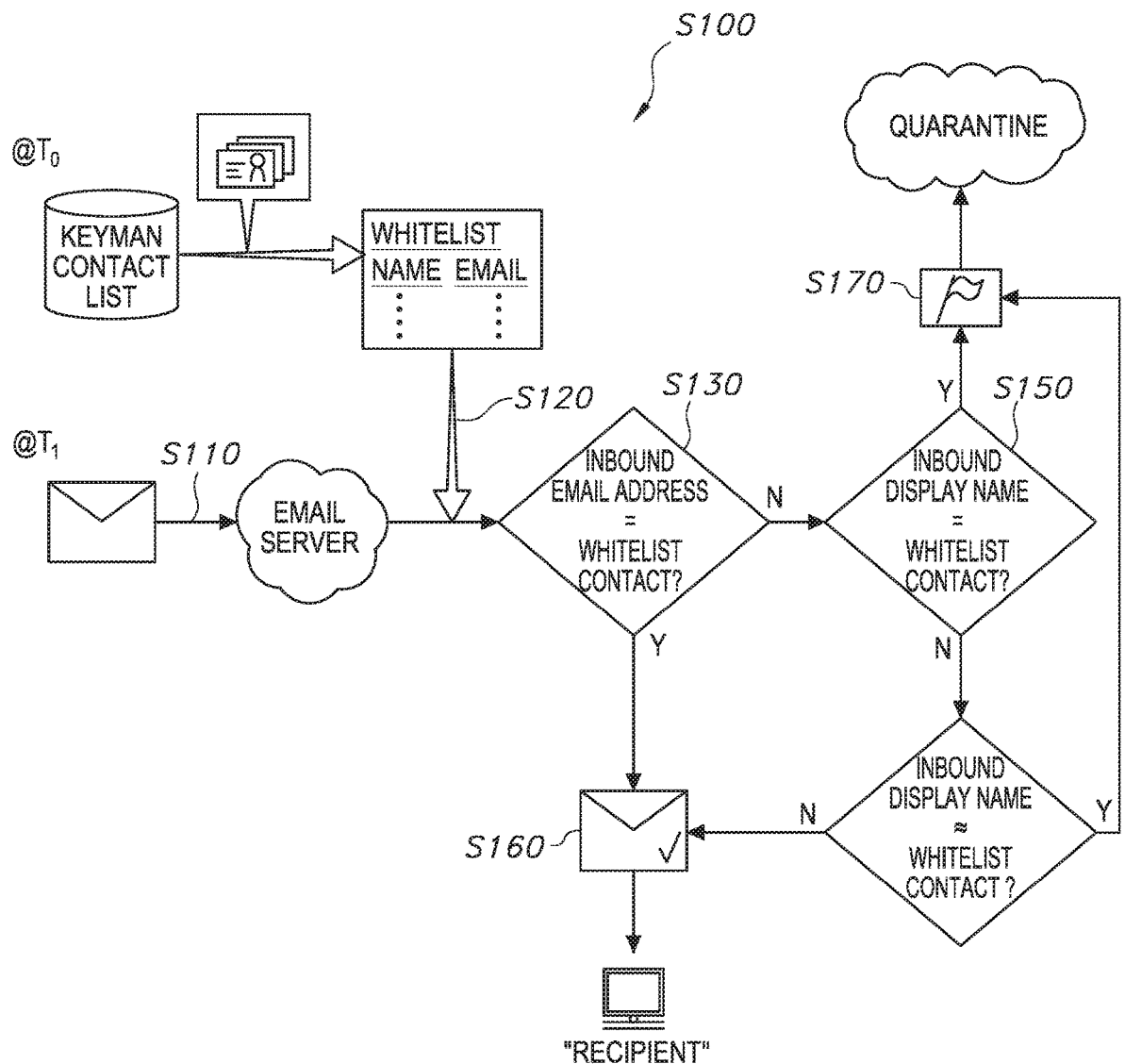
FIG. 2 is a schematic representation of the method.
Figure 3:
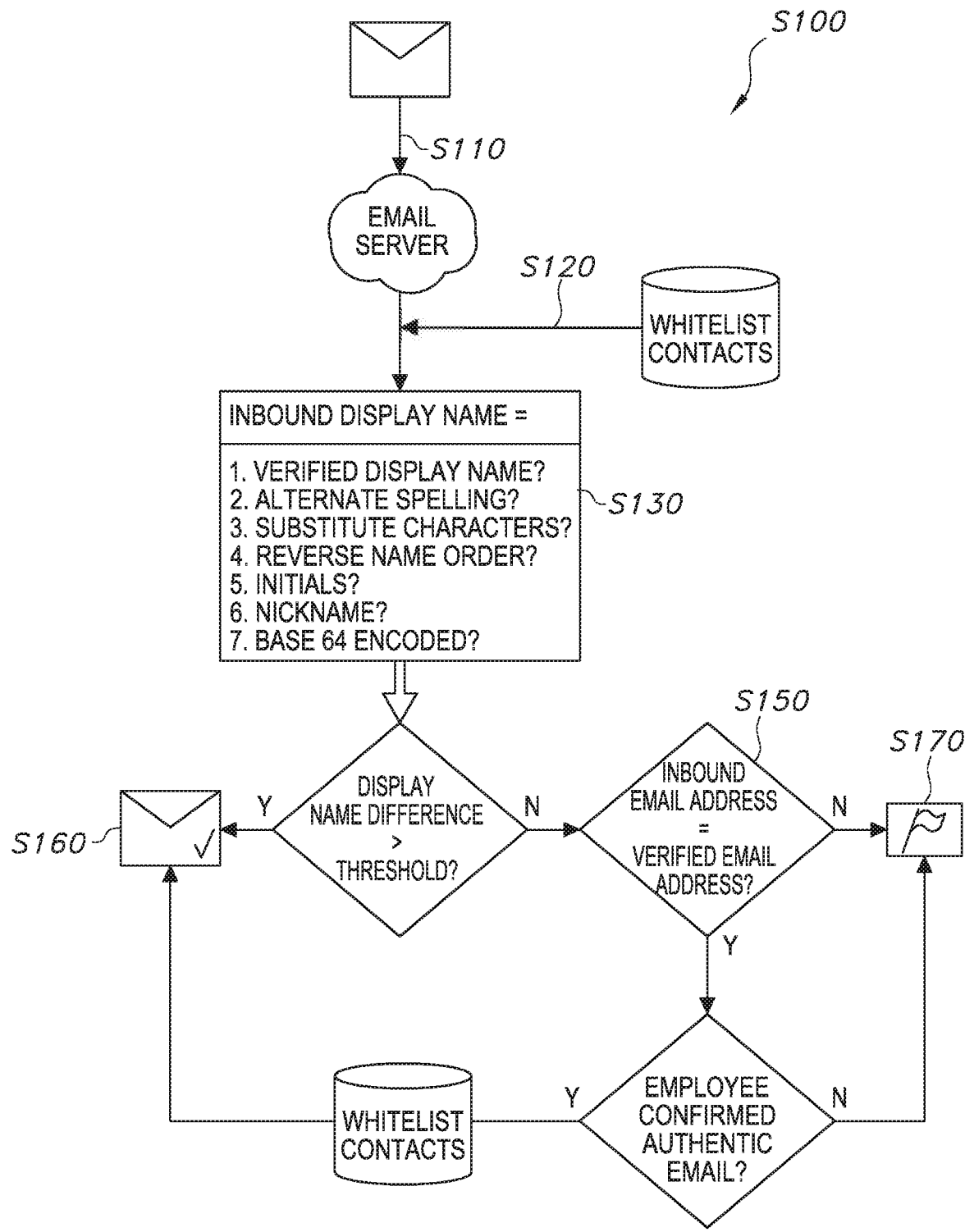
FIG. 3 is a schematic representation of the method.

In one variation, as shown in FIG. 2, the computer system can initially compare the inbound email address associated with an email to a set of verified email addresses included in the whitelist, prior to searching for the inbound display name. Upon finding an exact match of the inbound email address in the set of verified email addresses, the computer system can automatically authorize transmission of the email to a target recipient. Alternatively, the computer system can still compare the inbound display name to the verified display name in the whitelist as an additional check for authentication.

In one variation, the computer system can prompt a user to update a verified display name corresponding to the user in response to intercepting an email from the user at a verified email address but including an alternate display name. For example, the computer system can: intercept an email received from a first sender at a first inbound email address and including a first inbound display name; access a whitelist including a first set of contact information corresponding to a first employee within an organization, the set of contact information including a verified display name associated with the first employee and a set of verified email addresses associated with the first employee; identify the first inbound email address within the set of verified email addresses associated with the first employee; and, in response to identifying a difference between the first inbound display name and the first verified display name, generate a prompt for transmission to the first employee, the prompt requesting confirmation of the inbound display name as a new verified display name of the first employee and/or presenting instructions to update the first verified display name.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   intercepting a first email addressed to a first target recipient within an organization, the first email received from a first sender at a first inbound email address and comprising a first inbound display name;
   accessing a whitelist comprising a first set of contact information corresponding to a first employee within the organization, the first set of contact information comprising:
      a first verified display name associated with the first employee; and
      a first set of verified email addresses associated with the first employee;
   characterizing a first display name difference between the first inbound display name and the first verified display name associated with the first employee; and in response to the first display name difference falling
below a threshold difference:
comparing the first inbound email address to the first
set of verified email addresses associated with the
first employee;
in response to identifying the first inbound email
address in the first set of verified email addresses,
authorizing transmission of the first email to the first
target recipient; and
in response to the first set of verified email addresses
omitting the first inbound email address:
withholding transmission of the first email to the first
target recipient; and
flagging the first email for authentication.

2. The method of claim 1, further comprising, in response to the first display name difference exceeding the threshold difference, authorizing transmission of the first email to the target recipient.

3. The method of claim 1, further comprising, in response to identifying the first inbound email address in the first set of verified email addresses:
authenticating the first sender; and
generating a notification for inclusion in the first email indicating authentication of the first sender.

4. The method of claim 1:
further comprising, in response to flagging the first email for authentication, transmitting a notification to an email administrator requesting authentication of the first email; and
wherein the notification comprises a hyperlink to the first email.

5. The method of claim 4, further comprising:
in response to receiving authentication of the first email from the email administrator authorizing transmission of the first email to the first target recipient; and
in response to receiving rejection of the first email from the email administrator, discarding the first email.

6. The method of claim 1, further comprising, in response to the first set of verified email addresses omitting the first inbound email address, adding the first inbound email address to a blacklist comprising a set of fraudulent email addresses corresponding to fraudulent email attempts.

7. The method of claim 6, further comprising:
intercepting a second email addressed to a second target recipient within an organization, the second email received from a second sender at the first inbound email address and including a second inbound display name;
accessing the blacklist;
comparing the first email address to the set of fraudulent email addresses; and
in response to identifying the first inbound email address in the set of fraudulent email addresses, withholding transmission of the second email to the second target recipient.

8. The method of claim 1:
wherein comparing the first inbound email address to the first set of verified email addresses comprises:
comparing a first domain of the first inbound email address to a set of verified domains of the first set of verified email addresses; and
comparing a first handle of the first inbound email address to a set of verified handles corresponding to the first set of verified domains of the first set of verified email addresses;
wherein authorizing transmission of the first email in response to identifying the first inbound email address in the first set of verified email addresses comprises
authorizing transmission of the first email in response to identifying a combination of the first domain and the first handle in the first set of verified email addresses; and
wherein withholding transmission of the first email in response to the first set of verified email addresses omitting the first inbound email address comprises withholding transmission of the first in response to the first set of verified email addresses omitting the combination of the first domain and the first handle.

9. The method of claim 1:
wherein characterizing the first display name difference between the first inbound display name and the first verified display name comprises:
comparing a first set of characters of the first inbound display name to:
a first set of authentic characters comprising a forename of the first employee; and
a second set of authentic characters comprising a surname of the first employee;
comparing a second set of characters of the first inbound display name to:
the first set of authentic characters; and
the second set of authentic characters.

10. The method of claim 1, wherein characterizing the first display name difference between the first inbound display name and the first verified display name comprises:
comparing a first set of characters of the first inbound display name to a first set of authentic characters of the first verified display name;
identifying a first set of differences between the first set of characters and the first set of authentic characters; and
characterizing the first display name difference based on the first set of differences.

11. The method of claim 10:
wherein identifying a set of differences between the first set of characters and the first set of authentic characters comprises identifying a first difference between the first set of characters and the first set of authentic characters;
wherein identifying the first difference comprises identifying a first character, in the first set of characters, excluded from the first set of authentic characters; and
wherein characterizing the first display name difference based on the first set of differences comprises characterizing the first display name difference based on a quantity of differences in the first set of differences.

12. The method of claim 1, further comprising:
extracting a first forename from the first inbound display name;
accessing a name graph comprising a set of forenames, each forename connected to a subset of forenames, in the set of forenames, based on relationships between forenames;
identifying the first forename in the set of forenames of the name graph;
generating a list of related forenames comprising the first forename and a first subset of forenames connected to the first forename in the name graph;
comparing an authentic forename of the first employee to the list of related forenames; and
in response to identifying the authentic forename in the list of related forenames:
extracting a first surname from the first inbound display name; and
comparing an authentic surname of the first employee to the first surname.

13. The method of claim 1:
wherein, in response to identifying the first inbound email address in the first set of verified email addresses, authorizing transmission of the first email to the first target recipient further comprises:
  transmitting a prompt requesting confirmation of the inbound display name to the first employee;
  in response to receiving rejection of the inbound display name from the first employee, withholding transmission of the first email to the first target recipient; and
  in response to receiving confirmation of the inbound display name from the first employee:
    adding the inbound display name to the first set of contact information, corresponding to the first employee, within the whitelist; and
    authorizing transmission of the first email to the first target recipient.

14. The method of claim 1, further comprising:
intercepting a second email addressed to a second target recipient within the organization, the second email received from a second sender at a second inbound email address and including a second inbound display name;
accessing the whitelist comprising a second set of contact information corresponding to a second employee within the organization, the second set of contact information comprising:
  a second verified display name associated with the second employee; and
  a second set of verified email addresses associated with the second employee;
characterizing a second display name difference between the second inbound display name and the second verified display name associated with the second employee; and
in response to the second display name difference exceeding a threshold difference, authorizing transmission of the second email to the second target recipient.

15. The method of claim 1:
further comprising, in response to flagging the first email for authentication, transmitting the first email to a quarantine portal for authentication; and
wherein transmitting the first email to the quarantine portal comprises inserting the first email within a list of quarantined emails within the quarantine portal, the list of quarantined emails sorted by display name difference in descending order.

16. The method of claim 1, further comprising:
in response to flagging the first email for authentication, transmitting the first email to a quarantine portal for authentication by an email administrator;
at a first time, in response to receiving rejection of the first email from the email administrator, adding the first inbound display name to a blacklist comprising a set of fraudulent email addresses;
at a second time succeeding the first time, intercepting a second email addressed to a second target recipient within the organization, the second email received from a second sender at the first inbound email address;
accessing the blacklist comprising the first inbound display name; and
in response to identifying the first inbound display name in the set of fraudulent email addresses:
  withholding transmission of the second email to the second target recipient; and
  discarding the second email.

17. The method of claim 1:
wherein accessing the whitelist comprises accessing the whitelist comprising:
  the first set of contact information corresponding to the first employee within the organization; and
  a second set of contact information corresponding to a second employee within the organization, the second set of contact information comprising:
    a second verified display name associated with the second employee; and
    a second set of verified email addresses associated with the second employee; and
further comprising, in response to the first display name difference exceeding the threshold difference, characterizing a second display name difference between the first inbound display name and a second verified display name associated with the second employee.

18. The method of claim 17:
wherein accessing the whitelist comprises accessing the whitelist comprising:
  the first set of contact information corresponding to the first employee of a first rank within the organization; and
  the second set of contact information corresponding to the second employee of a second rank below the first rank within the organization;
wherein comparing the first inbound email address to the first set of verified email addresses in response to the first display name difference falling below the threshold difference comprises comparing the first inbound email address to the first set of verified email addresses in response to the first display name difference falling below a first threshold difference corresponding to employees of the first rank;
further comprising, in response to the second display name difference falling below a second threshold difference less than the threshold difference, the second threshold difference corresponding to employees of the second rank; and
further comprising in response to the second display name difference exceeding the second threshold difference, authorizing transmission of the first email.

19. A method comprising:
intercepting a first email addressed to a first target recipient within an organization, the first email received from a first sender at a first inbound email address and including a first inbound display name;
accessing a first set of contact information corresponding to a first employee within the organization, the first set of contact information comprising:
  a first set of verified email addresses associated with the first employee; and
  a first verified display name associated with the first employee;
comparing the first inbound email address to the first set of verified email addresses associated with the first employee; and
in response to the first set of verified email addresses excluding the first inbound email address:
  characterizing a first display name difference between the first inbound display name and the first verified display name associated with the first employee;

in response to the first display name difference exceeding the threshold difference, authorizing transmission of the first email to the first target recipient; and in response to the first display name difference falling below a threshold difference:
- withholding transmission of the first email to the first target recipient; and
- flagging the first email for authentication.

20. The method of claim 19, further comprising, in response to identifying the first inbound email address in the first set of verified email addresses, authorizing transmission of the first email to the first target recipient.

* * * * *